United States Patent [19]
Ikemori et al.

[11] 4,400,064
[45] Aug. 23, 1983

[54] ZOOM LENS

[75] Inventors: Keiji Ikemori, Yokohama; Akira Tajima, Kawasaki, both of Japan

[73] Assignee: Canon Kabushiki Kaisha, Tokyo, Japan

[21] Appl. No.: 281,554

[22] Filed: Jul. 8, 1981

[30] Foreign Application Priority Data

Jul. 11, 1980 [JP] Japan .................. 55-94776

[51] Int. Cl.³ .................. G02B 3/04; G02B 15/14
[52] U.S. Cl. .................. 350/426; 350/432
[58] Field of Search .................. 350/426, 432–435

[56] References Cited

U.S. PATENT DOCUMENTS

| | | | |
|---|---|---|---|
| 4,153,339 | 5/1979 | Tajima et al. | 350/426 |
| 4,159,865 | 7/1979 | Kawamura et al. | 350/426 |
| 4,240,701 | 12/1980 | Lytle | 350/432 |

FOREIGN PATENT DOCUMENTS

2818966 11/1978 Fed. Rep. of Germany ...... 350/426

*Primary Examiner*—John K. Corbin
*Assistant Examiner*—Scott J. Sugarman
*Attorney, Agent, or Firm*—Toren, McGeady and Stanger

[57] ABSTRACT

A zoom lens comprising, from front to rear, a first lens group of negative power, and a second lens group of positive power with the axial air separation therebetween being variable to effect zooming. The first lens group includes at least one negative lens element and one positive lens element, and the negative lens element has its one surface configured to an aspheric shape, and is made of a plastic material. The bulk and size of the lens system is minimized even though the aberrations are well corrected.

6 Claims, 28 Drawing Figures

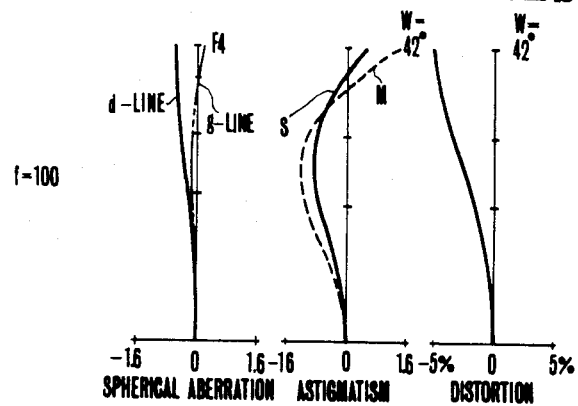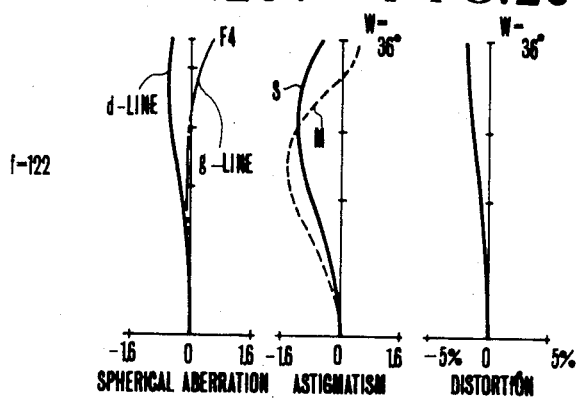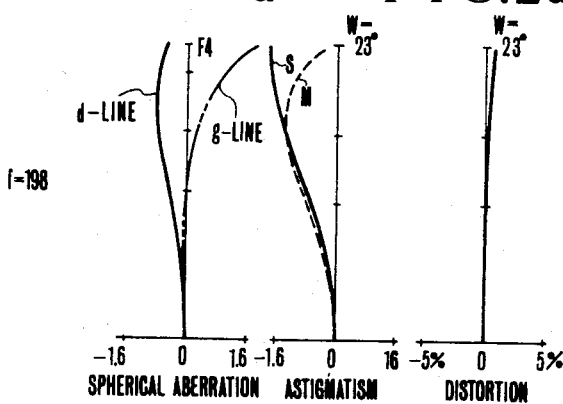

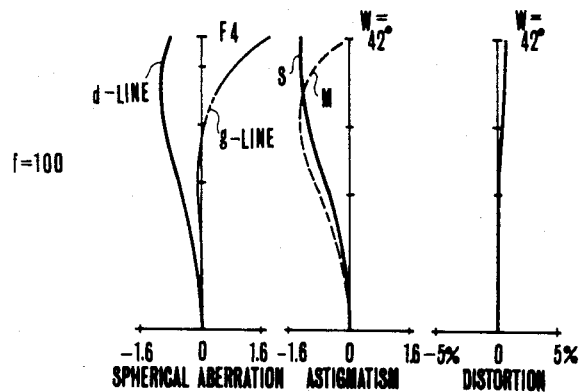
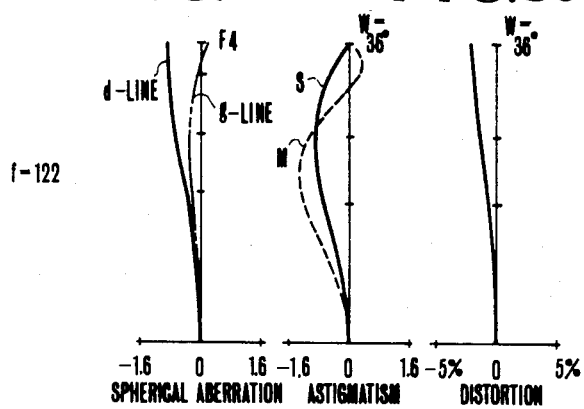
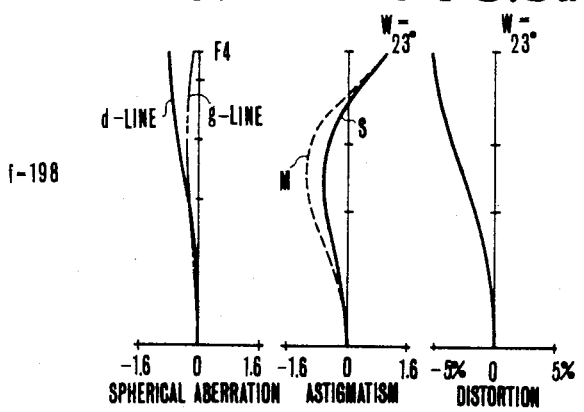

ZOOM LENS

BACKGROUND OF THE INVENTION

1. Field of the Invention

This invention relates to zoom lenses including wide angle regions for photography, and more particularly to two-group type zoom lenses of small size with an aspheric surface.

2. Description of the Prior Art

As the zoom lenses include wide angle regions for photography, wide spread use is made of the zoom type comprising two lens groups of which the first, counting from the front, is of negative refractive power, and the second is of positive refractive power with the axial air separation between both lens groups made variable to effect zooming. This is because the negative lens group-preceded or so-called two-group type zoom lens is suited for aberration correction in the wide angle region.

However, even with the two-group type zoom lens, when great importance is placed on the imaging performance in the wide angle regions, and particularly when the zooming range is extended toward shorter focal lengths with the resultant prominently intensified distortion well corrected, the number of lens elements in the first group must be increased, or otherwise such correction would be very difficult to perform. The use of the increased number of lens elements in facilitating the aberration correction, however, necessarily results in a complicated lens construction of the first lens group which in turn causes the bulk and size of the lens system to be increased and the handling to become difficult. The production cost of the objective also increases.

The known practice in the art is to employ an aspherical lens constituting a part of the lens system for assisting in the stabilization of the aberrations throughout the extended zooming range. The lens, to which the aspherical surface is applied, is formed with the use of a plastic material, contributing to a decrease in the production cost of the objective. These ideas are proposed in U.S. Pat. Nos. 4,159,865 and 3,912,379 and Japanese Laid Open Patent Application No. Sho 54-139752.

SUMMARY OF THE INVENTION

It is an object of the present invention to provide a two-group type zoom lens in which the first group is constructed in a simple and small form, suitable for low unit cost production techniques, while still permitting good correction of the aberrations.

One of the features of the present invention is the predesign of a zoom lens with advantages of wide angle regions. The so-called two-group type is adopted, and, as the first or front lens group becomes relatively large in the outer diameter, the required number of lens members in the front group is reduced to achieve an easily manageable proportion of the entire lens system. The deterioration of imagery which would otherwise result from such a reduction of the number of lens members is avoided by introducing an aspherical lens. A plastic material is used in making the aspherical lens in part, because production cost is decreased. Further, the aspherical surface is embodied in a negative lens surface to facilitate correction of aberrations.

BRIEF DESCRIPTION OF THE DRAWINGS

FIGS. 1b (consisting of FIGS. 1b-1, 1b-2, and 1b-3), 1c (consisting of FIGS. 1c-1, 1c-2, and 1c-3) and 1d (consisting of FIGS. 1d-1, 1d-2, and 1d-3) are graphic representations of the various aberrations of the zoom lens of FIG. 1a respectively in the wide angle, middle and telephoto positions.

FIGS. 2a to 7a are lens block diagrams of embodiments 2 to 7 of the present invention with their various aberrations in the three different operative positions, being shown respectively in the FIGS. 2b to 2d, 3b to 3d, and so on until 7b to 7d. It will be understood that each of these figure numbers identifies a set of figures. For example, FIG. 2b refers to FIGS. 2b-1, 2b-2 and 2b-3.

DETAILED DESCRIPTION OF THE PREFERRED EMBODIMENTS

Figure 1A:
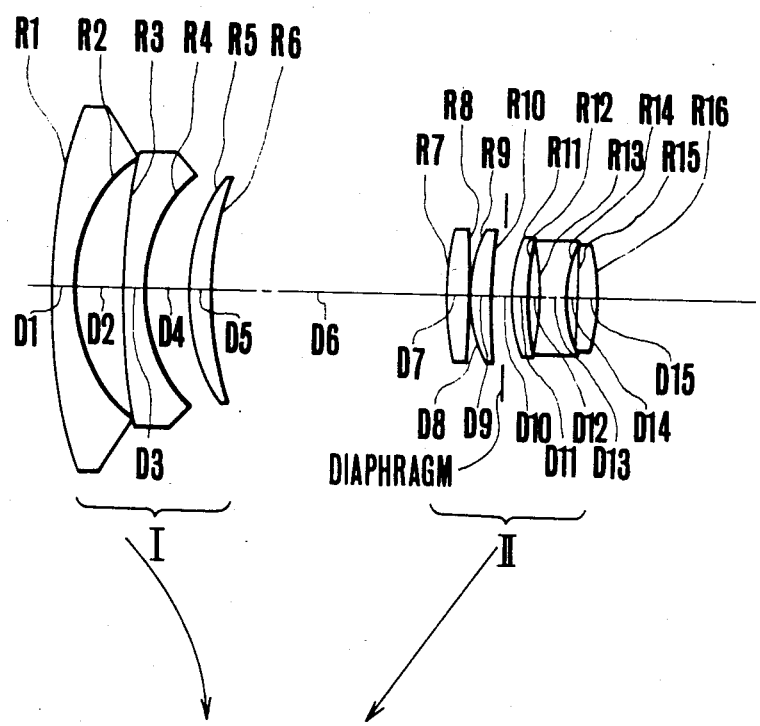
FIG. 1a is a lens block diagram of an embodiment 1 of the present invention.
Figures 1, 1B, 2, 3:
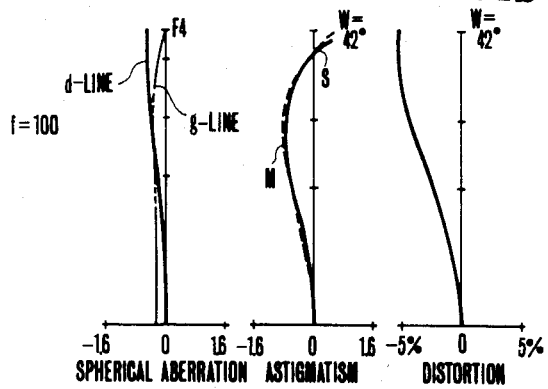
Figures 1, 1C, 2, 3:
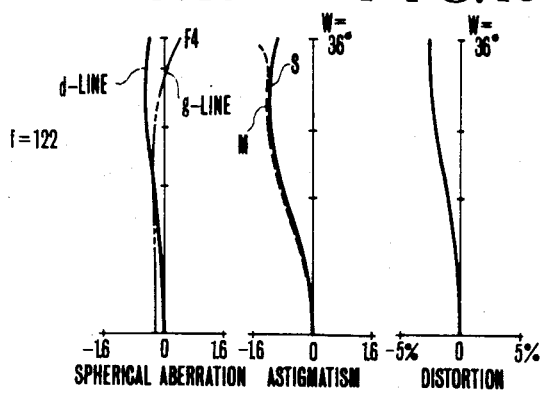
Figures 1, 1D, 2, 3:
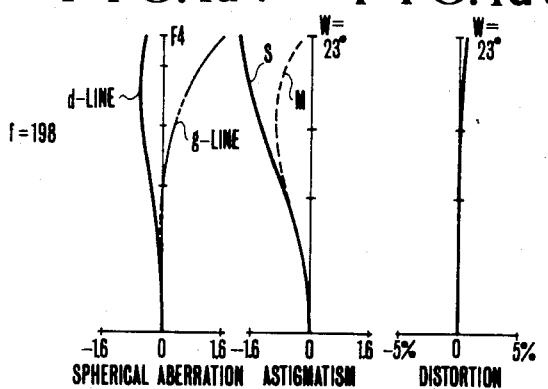
Figure 2A:
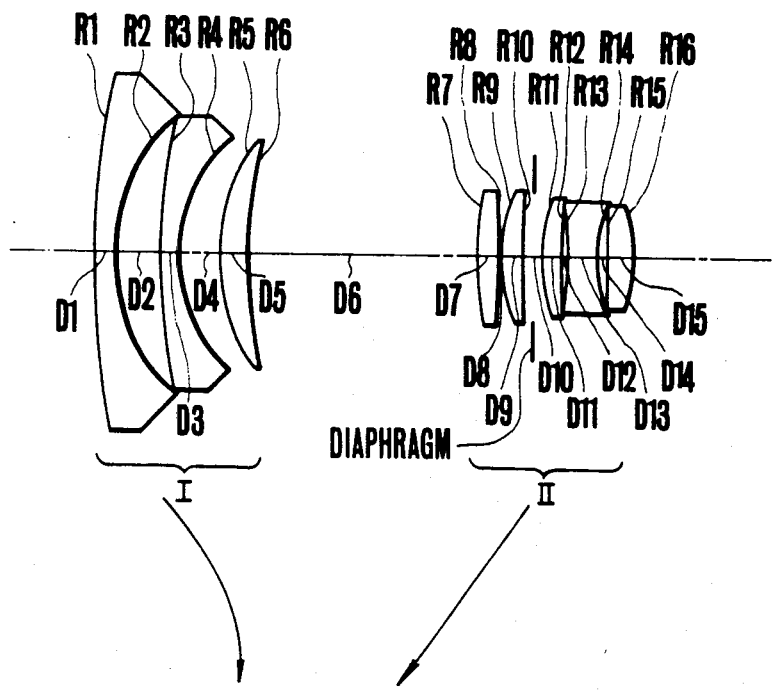
Figure 3A:
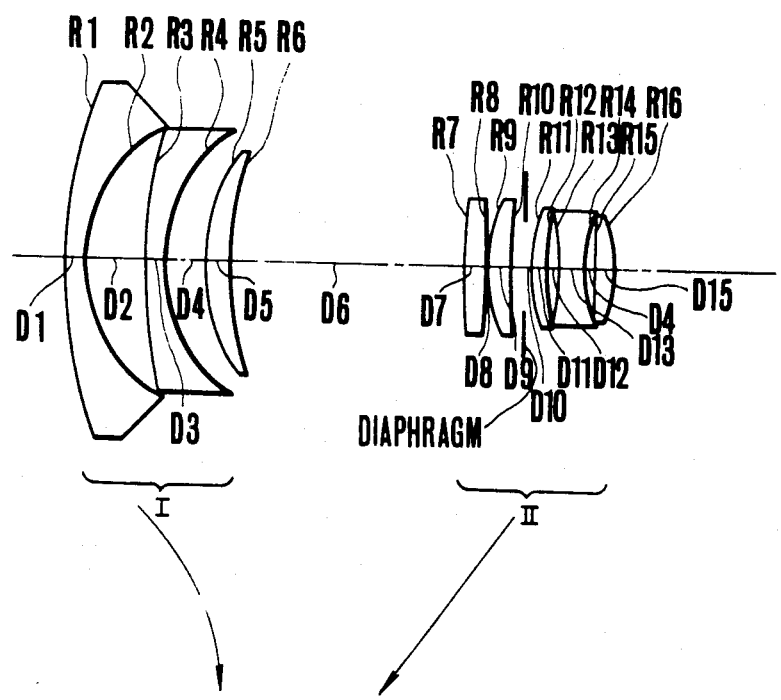
Figures 1, 2, 3, 3B:
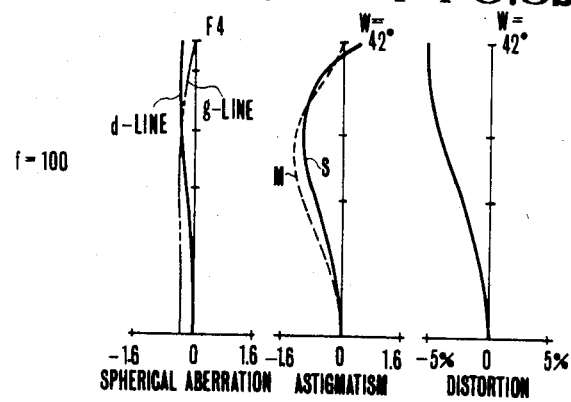
Figures 1, 2, 3, 3C:
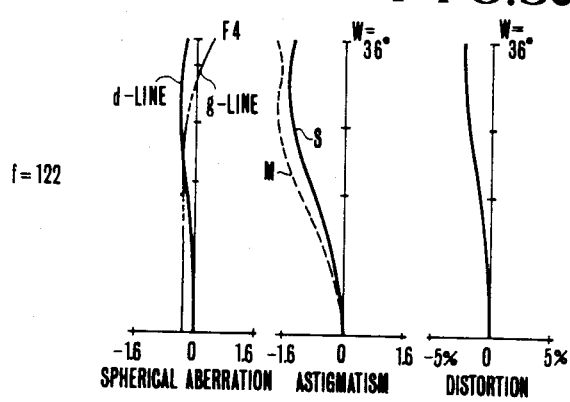
Figures 1, 2, 3, 3D:
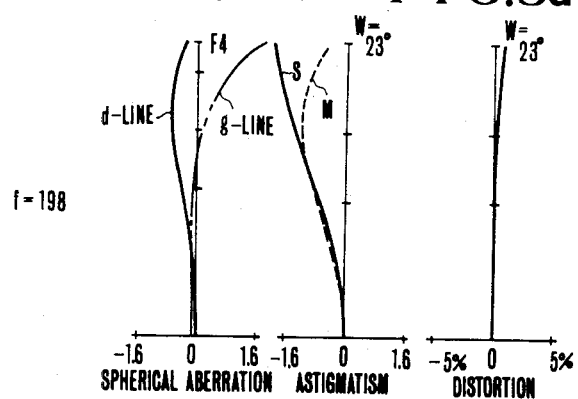
Figure 4A:
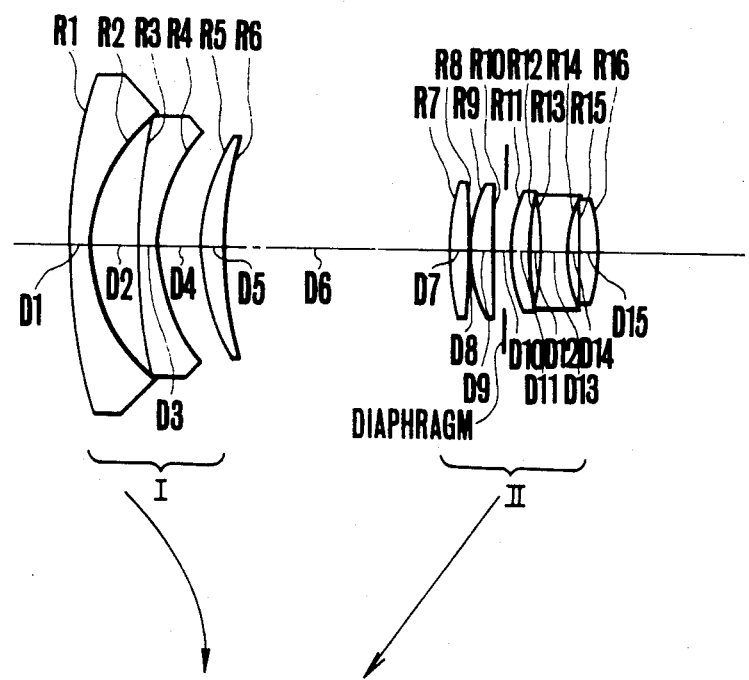
Figures 1, 2, 3, 4B:
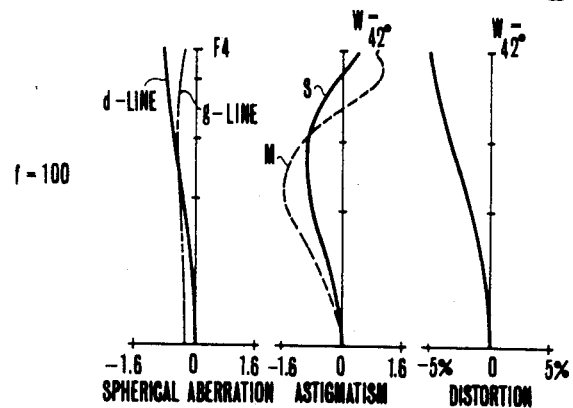
Figures 1, 2, 3, 4C:
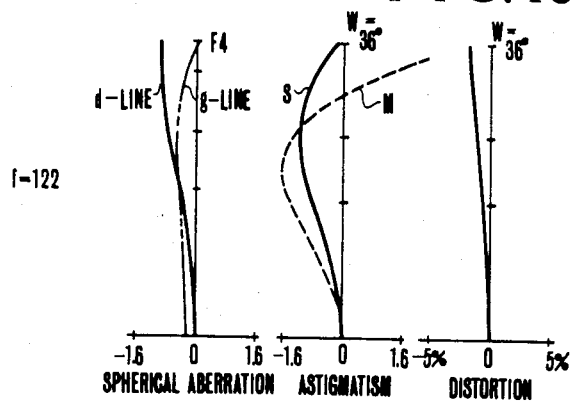
Figures 1, 2, 3, 4D:
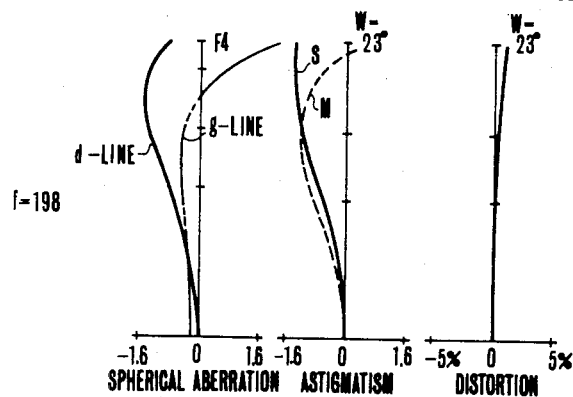
Figure 5A:
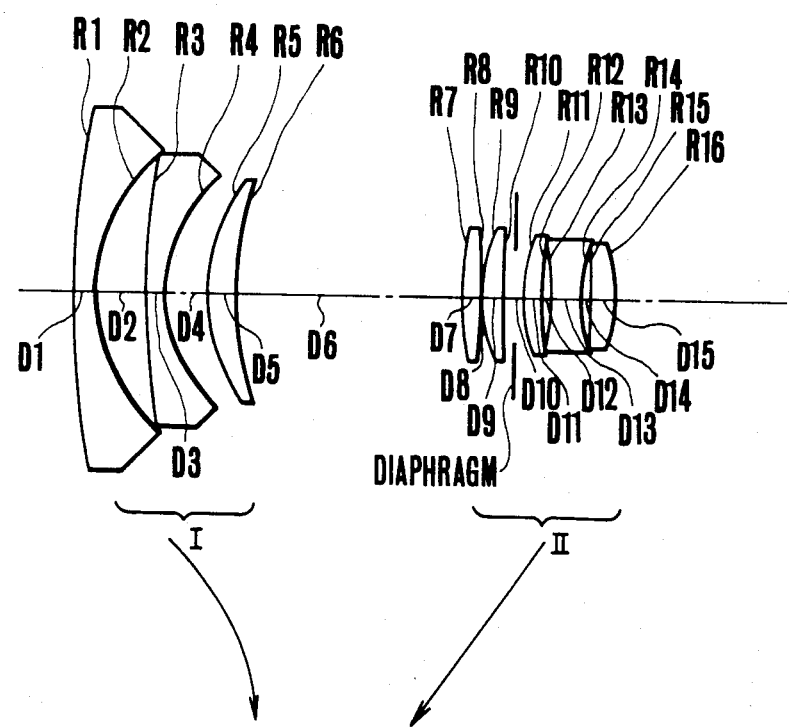
Figure 6A:
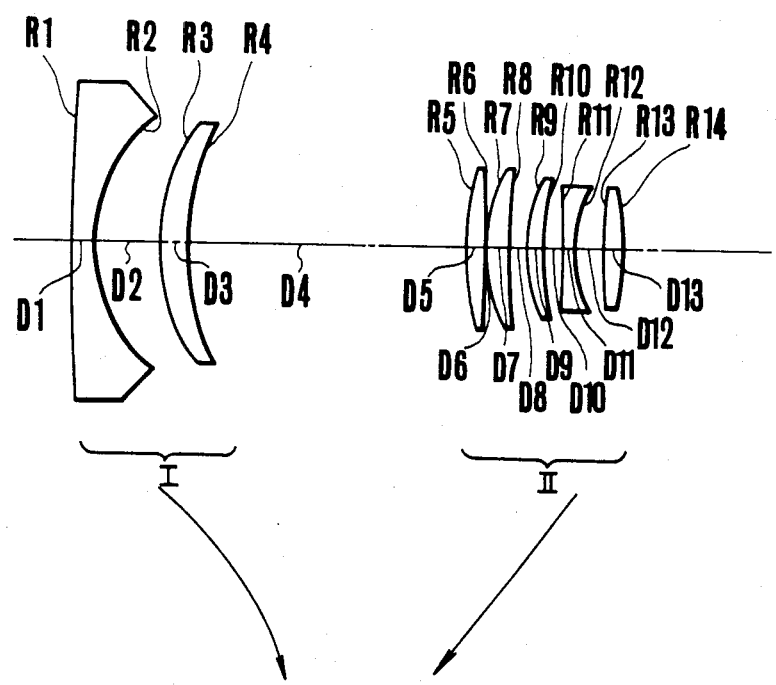
Figures 1, 2, 3, 6B:
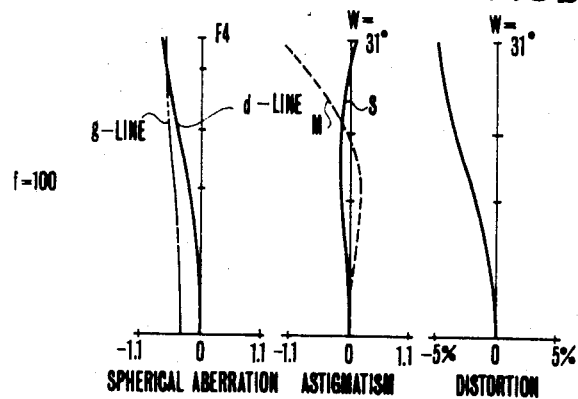
Figures 1, 2, 3, 6C:
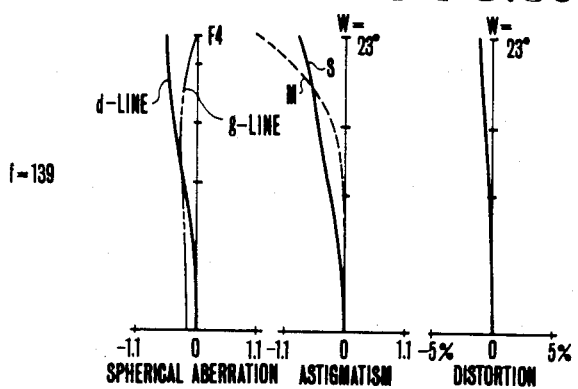
Figures 1, 2, 3, 6D:
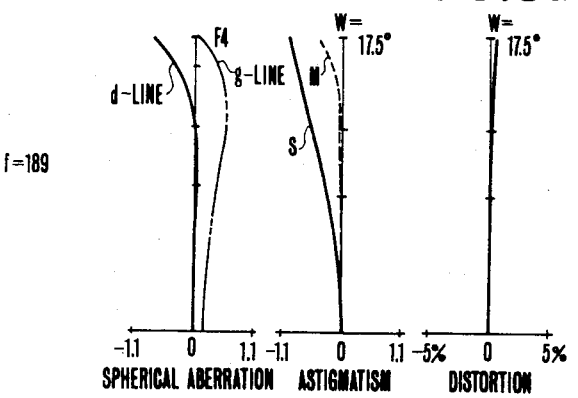
Figure 7A:
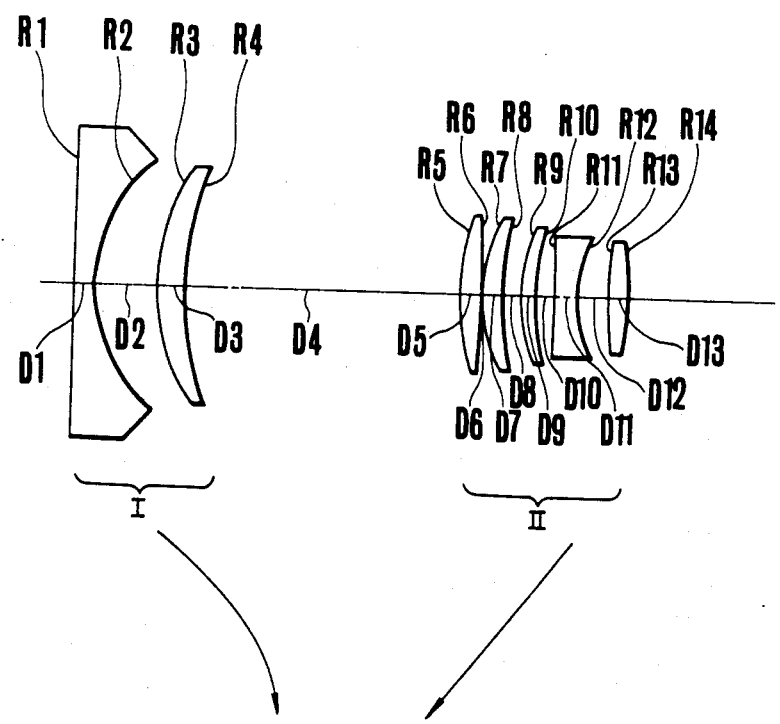
Figures 1, 2, 3, 7B:
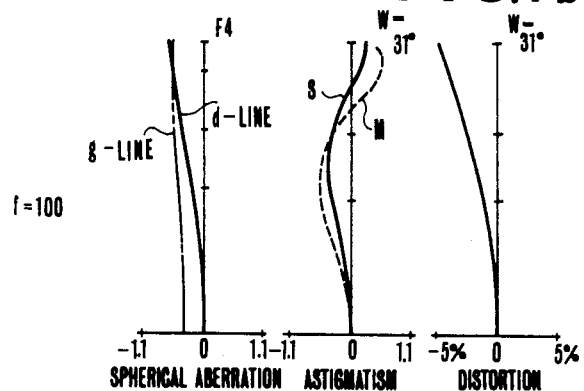
Figures 1, 2, 3, 7C:
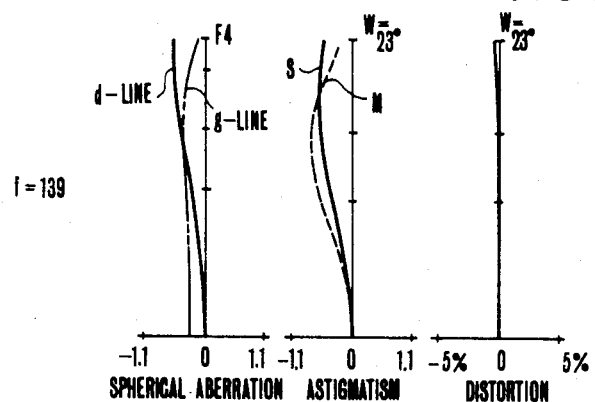
Figures 1, 2, 3, 7D:
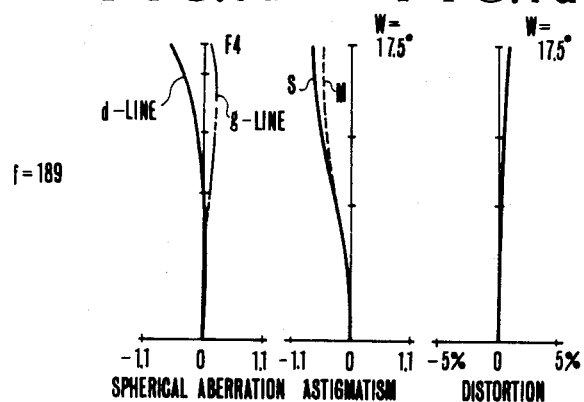

In FIGS. 1a to 7a, there are diagrammatically illustrated zoom lenses of the preferred form of the present invention. According to the present invention, an aspherical surface is employed to facilitate a much-desired minimization of the bulk and size of the two-group type zoom lens. An explanation of the significance of the aspherical surface which is generally found in the embodiments of the invention follows.

In designing the two-group type of zoom lens without the introduction of any aspherical surface, or in the form of a spherical system only, the first lens group usually has a relatively large number of members to provide a high grade imagery. For example, for the angular field ranging from 84° to 46° with the zoom ratio of about 2, 6 lens members are required (U.S. Pat. No. 4,147,410). For the angular field ranging from 62° to 35° with the zoom ratio of about 2, 3 or 4 lens members are required (U.S. Pat. No. 4,169,660 and D. P. No. 2 601 499). In contrast to these conventional zoom lenses, the introduction of the aspherical surface in the former case, which corresponds to the embodiments 1 to 5 of the invention, can reduce the required number of lens members to 3. In the latter case, which corresponds to the practical embodiments 6 and 7 of the invention, to 2, while still permitting good correction of the aberrations.

The necessary number of lens members in the first group can be decreased substantially when a aspherical surface is utilized because that surface plays a role of great importance in the correction of distortion in the side angle positions. It is generally proven that for correction of negative distortion produced in the wide angle positions, the addition of a positive refractive power in front of the diaphragm is very effective. When the aspherical surface is configured to such shape that as the height of incidence from the optical axis increases, the positive refractive power is increased, an improved result can be obtained. This is because the aspherical surface functions to impart a positive refractive power only to the marginal zone of the angular field without having to produce any influence on the refractive power in the paraxial zone. This added positive refractive power causes production of a positive distortion which is balanced with the negative distortion.

If the aspherical surface is not employed and a positive lens is provided to correct distortion, variation of the overall refractive power of the first lens group, requires either the addition of a negative lens of such power, or an increase in the power of the original negative lenses to such value, that the overall refractive power of the 1st lens group is maintained constant.

Though the distortion is corrected toward the positive direction by the addition of the positive lens, a negative distortion is also produced by the addition of the negative lens, or by the increase in the negative fraction of the power of the 1st lens group. It is thus very difficult to provide good distortion correction. When an aspherical surface is employed, the above-mentioned problems are not encountered and thus a further improvement in the distortion correction can be achieved. The additional positive lens may be omitted, and one negative lens suffices in the prevention of the production of distortion which would otherwise require two negative lenses as in the prior art. Thus, a remarkable reduction of the necessary number of lens members in the 1st lens group can be achieved.

Another feature of the present invention is that the aspherical lens element used in the zoom lens is made up of a plastic material with a double advantage that the production cost of the aspherical surface is lowered and mass production is made possible. If the aspherical lens is made up of glass material, it takes a long time to produce the aspherical surface by the optical grinding and polishing process, and the production cost is greatly increased. Thus, the use of plastic material in the aspheric lens is very beneficial to the mass production of cameras and the like.

Another feature of the invention is that the aspherical plastic lens element is included within the 1st lens group and particularly in place of the negative lens element. The making of the distortion correction in a more distant position from the diaphragm is more advantageous. As far as the wide angle zoom lenses are concerned, a negative lens element is often arranged in the frontmost position within the 1st lens group and the optical plastic materials available at the present time have a range of refractive indices and dispersions suitable for aberration correction of the negative lens element. If a plastic material having a high refractive index and a high dispersion were developed, this might be used in a positive lens element to effect an equivalent result.

Seven examples of specific zoom lenses of the invention are disclosed. Examples 1 to 5 are for the angular field ranging from 84° to 46° with a zoom ratio of about 2. Examples 6 and 7 are for the angular field ranging from 62° to 35° with a zoom ratio of about 2. These examples can be constructed in accordance with the numerical data given below: for the radius of curvature, Ri, of the i-th lens surface, the i-th axial separation between the successive two lens surfaces along with the refractive index Ni and Abbe number Vi of the glass of plastic material from which the i-th lens element counting from the front is made up.

An equation for the aspherical surface is defined as follows:

$$x = \frac{\left(\frac{1}{\gamma}\right) h^2}{1 + \sqrt{1 - \left(\frac{h}{\gamma}\right)^2}} + Bh^4 + Ch^6 + Dh^8 + Eh^{10} + D'|h|^9$$

where $x$ is the amount of axial deviation of the aspherical surface from the basic spherical surface; $h$ is the height in a direction perpendicular to the optical axis; and B, C, D, E and D' are aspherical coefficients.

The zoom lenses, corresponding to the numerical data in Examples 1 to 7, are diagrammatically illustrated together with their various aberrations respectively where the paths of movement of the first and second lens groups during zooming are indicated by a curved and straight line respectively, and variations of the various aberrations are depicted in three different zooming or wide angle, middle and telephoto positions. In the aberration curves, M denotes a meridional focus line, and S a sagittal focus line.

EXAMPLE 1

| R1  | 425.80  | D1  | 11.42    | N1 | 1.49171 | v1 | 57.4 |
|-----|---------|-----|----------|----|---------|----|------|
| R2  | 94.63   | D2  | 28.32    |    |         |    |      |
| R3  | 361.32  | D3  | 11.42    | N2 | 1.62230 | v2 | 53.2 |
| R4  | 89.35   | D4  | 24.28    |    |         |    |      |
| R5  | 107.94  | D5  | 15.21    | N3 | 1.69895 | v3 | 30.1 |
| R6  | 219.51  | D6  | Variable |    |         |    |      |
| R7  | 197.52  | D7  | 13.04    | N4 | 1.60311 | v4 | 60.7 |
| R8  | −810.51 | D8  | 0.61     |    |         |    |      |
| R9  | 89.71   | D9  | 11.31    | N5 | 1.51633 | v5 | 64.1 |
| R10 | 291.27  | D10 | 11.84    |    |         |    |      |
| R11 | 94.53   | D11 | 10.28    | N6 | 1.51633 | v6 | 64.1 |
| R12 | 298.44  | D12 | 4.79     |    |         |    |      |
| R13 | −309.51 | D13 | 16.58    | N7 | 1.80518 | v7 | 25.4 |
| R14 | 76.61   | D14 | 5.07     |    |         |    |      |
| R15 | 459.96  | D15 | 12.73    | N8 | 1.66680 | v8 | 33.0 |
| R16 | −104.06 |     |          |    |         |    |      |

Thick Lens Separations during Zooming with Object at Infinity

| Focal Length | D6     |
|--------------|--------|
| 100.0        | 132.53 |
| 122.45       | 86.50  |
| 197.96       | 8.29   |

The first surface is aspherical, and the aspherical coefficients have the following values:

$$B = 2.8766 \times 10^{-8} \quad C = 6.5551 \times 10^{-13}$$
$$D = 2.4475 \times 10^{-17} \quad E = -3.4041 \times 10^{-21}$$
$$D' = 3.5180 \times 10^{-19}$$

The first lens is a plastic lens.

EXAMPLE 2

| R1  | 489.73  | D1  | 11.42    | N1 | 1.49171 | v1 | 57.4 |
|-----|---------|-----|----------|----|---------|----|------|
| R2  | 90.63   | D2  | 24.62    |    |         |    |      |
| R3  | 325.59  | D3  | 11.42    | N2 | 1.62230 | v2 | 53.2 |
| R4  | 86.25   | D4  | 23.05    |    |         |    |      |
| R5  | 108.55  | D5  | 16.20    | N3 | 1.69895 | v3 | 30.1 |
| R6  | 249.67  | D6  | Variable |    |         |    |      |
| R7  | 198.49  | D7  | 12.74    | N4 | 1.60311 | v4 | 60.7 |
| R8  | −996.01 | D8  | 0.61     |    |         |    |      |
| R9  | 87.16   | D9  | 11.38    | N5 | 1.51633 | v5 | 64.1 |
| R10 | 299.22  | D10 | 11.84    |    |         |    |      |
| R11 | 93.11   | D11 | 11.27    | N6 | 1.51633 | v6 | 64.1 |
| R12 | 379.29  | D12 | 3.48     |    |         |    |      |
| R13 | −285.28 | D13 | 16.58    | N7 | 1.80518 | v7 | 25.4 |
| R14 | 74.83   | D14 | 5.24     |    |         |    |      |
| R15 | 658.02  | D15 | 15.50    | N8 | 1.66680 | v8 | 33.0 |
| R16 | −98.59  |     |          |    |         |    |      |

Thick Lens Separations during Zooming with Object at Infinity

| Focal Length | D6     |
|--------------|--------|
| 100.0        | 130.15 |
| 122.45       | 84.12  |

-continued

| | |
|---|---|
| 197.96 | 5.91 |

The 1st lens is a plastic lens with its second surface being aspherical, and the aspherical coefficients have the following values:

| | | | |
|---|---|---|---|
| B = | $-7.7969 \times 10^{-8}$ | C = | $-1.5760 \times 10^{-11}$ |
| D = | $1.2510 \times 10^{-15}$ | E = | $-4.8487 \times 10^{-19}$ |
| D' = | $1.9440 \times 10^{-18}$ | | |

EXAMPLE 3

| R1 | 261.40 | D1 | 11.42 | N1 | 1.62230 | ν1 | 53.2 |
|---|---|---|---|---|---|---|---|
| R2 | 87.03 | D2 | 35.11 | | | | |
| R3 | 471.85 | D3 | 11.42 | N2 | 1.49171 | ν2 | 57.4 |
| R4 | 92.09 | D4 | 22.02 | | | | |
| R5 | 108.13 | D5 | 14.48 | N3 | 1.69895 | ν3 | 30.1 |
| R6 | 207.57 | D6 | Variable | | | | |
| R7 | 195.46 | D7 | 14.22 | N4 | 1.60311 | ν4 | 60.7 |
| R8 | −844.45 | D8 | 0.61 | | | | |
| R9 | 88.11 | D9 | 12.98 | N5 | 1.51633 | ν5 | 64.1 |
| R10 | 317.68 | D10 | 11.84 | | | | |
| R11 | 95.31 | D11 | 9.98 | N6 | 1.51633 | ν6 | 64.1 |
| R12 | 248.95 | D12 | 4.36 | | | | |
| R13 | −309.21 | D13 | 16.58 | N7 | 1.80518 | ν7 | 25.4 |
| R14 | 76.00 | D14 | 4.91 | | | | |
| R15 | 389.82 | D15 | 10.70 | N8 | 1.66680 | ν8 | 33.0 |
| R16 | −106.36 | | | | | | |

Thick Lens Separations during Zooming with Object at Infinity

| Focal Length | D6 |
|---|---|
| 100.00 | 130.38 |
| 122.45 | 84.35 |
| 197.96 | 6.14 |

The second lens is a plastic lens with the 3rd surface being aspherical and the aspherical coefficients have the following values:

| | | | |
|---|---|---|---|
| B = | $5.5411 \times 10^{-8}$ | C = | $4.7198 \times 10^{-12}$ |
| D = | $7.4957 \times 10^{-17}$ | E = | $6.6832 \times 10^{-20}$ |
| D' = | $1.1162 \times 10^{-18}$ | | |

EXAMPLE 4

| R1 | 317.98 | D1 | 11.42 | N1 | 1.62230 | ν1 | 53.2 |
|---|---|---|---|---|---|---|---|
| R2 | 87.31 | D2 | 26.79 | | | | |
| R3 | 324.16 | D3 | 11.42 | N2 | 1.49171 | ν2 | 57.4 |
| R4 | 86.76 | D4 | 24.34 | | | | |
| R5 | 117.66 | D5 | 14.14 | N3 | 1.69895 | ν3 | 30.1 |
| R6 | 256.80 | D6 | Variable | | | | |
| R7 | 203.13 | D7 | 9.68 | N4 | 1.60311 | ν4 | 60.7 |
| R8 | −985.77 | D8 | 0.61 | | | | |
| R9 | 84.69 | D9 | 12.01 | N5 | 1.51633 | ν5 | 64.1 |
| R10 | 327.99 | D10 | 11.84 | | | | |
| R11 | 94.55 | D11 | 11.40 | N6 | 1.51633 | ν6 | 64.1 |
| R12 | 261.85 | D12 | 4.13 | | | | |
| R13 | −273.51 | D13 | 16.58 | N7 | 1.80518 | ν7 | 25.4 |
| R14 | 75.58 | D14 | 5.41 | | | | |
| R15 | 611.89 | D15 | 11.82 | N8 | 1.66680 | ν8 | 33.0 |
| R16 | −96.33 | | | | | | |

Thick Lens Separations during Zooming with Object at Infinity

| Focal Length | D6 |
|---|---|
| 100.00 | 128.95 |
| 122.45 | 82.92 |
| 197.96 | 4.71 |

The second lens is a plastic lens with the 4th surface being aspherical and the aspherical coefficients have the following values:

| | | | |
|---|---|---|---|
| B = | $-1.3384 \times 10^{-7}$ | C = | $-1.8639 \times 10^{-11}$ |
| D = | $1.0415 \times 10^{-15}$ | E = | $-6.8079 \times 10^{-19}$ |
| D' = | $-2.5821 \times 10^{-18}$ | | |

EXAMPLE 5

| R1 | 533.52 | D1 | 11.42 | N1 | 1.49171 | ν1 | 57.4 |
|---|---|---|---|---|---|---|---|
| R2 | 90.51 | D2 | 28.45 | | | | |
| R3 | 386.78 | D3 | 11.42 | N2 | 1.49171 | ν2 | 57.4 |
| R4 | 84.96 | D4 | 24.90 | | | | |
| R5 | 107.91 | D5 | 15.73 | N3 | 1.69895 | ν3 | 30.1 |
| R6 | 204.89 | D6 | Variable | | | | |
| R7 | 198.56 | D7 | 9.92 | N4 | 1.60311 | ν4 | 60.7 |
| R8 | −997.17 | D8 | 0.61 | | | | |
| R9 | 87.26 | D9 | 12.14 | N5 | 1.51633 | ν5 | 64.1 |
| R10 | 291.14 | D10 | 11.84 | | | | |
| R11 | 94.15 | D11 | 11.49 | N6 | 1.51633 | ν6 | 64.1 |
| R12 | 359.69 | D12 | 3.83 | | | | |
| R13 | −295.94 | D13 | 16.58 | N7 | 1.80518 | ν7 | 25.4 |
| R14 | 74.85 | D14 | 5.18 | | | | |
| R15 | 616.99 | D15 | 14.22 | N8 | 1.66680 | ν8 | 33.0 |
| R16 | −99.50 | | | | | | |

Thick Lens Separation during Zooming with Object at Infinity

| Focal Length | D6 |
|---|---|
| 100.00 | 129.08 |
| 122.45 | 83.05 |
| 197.96 | 4.85 |

The 1st and 2nd lenses are plastic lenses with the 2nd surface being aspherical, and the aspherical coefficients have the following values:

| | | | |
|---|---|---|---|
| B = | $-7.1862 \times 10^{-8}$ | C = | $-1.3930 \times 10^{-11}$ |
| D = | $1.2760 \times 10^{-15}$ | E = | $-4.8728 \times 10^{-19}$ |
| D' = | $1.9398 \times 10^{-18}$ | | |

EXAMPLE 6

| R1 | 4436.31 | D1 | 7.77 | N1 | 1.49171 | ν1 | 57.4 |
|---|---|---|---|---|---|---|---|
| R2 | 60.31 | D2 | 25.88 | | | | |
| R3 | 76.34 | D3 | 11.11 | N2 | 1.69895 | ν2 | 30.1 |
| R4 | 101.73 | D4 | Variable | | | | |
| R5 | 114.96 | D5 | 7.25 | N3 | 1.60311 | ν3 | 60.7 |
| R6 | −1134.03 | D6 | 0.41 | | | | |
| R7 | 61.64 | D7 | 8.80 | N4 | 1.51633 | ν4 | 64.1 |
| R8 | 156.63 | D8 | 7.61 | | | | |
| R9 | 69.76 | D9 | 6.45 | N5 | 1.51633 | ν5 | 64.1 |
| R10 | 113.31 | D10 | 7.01 | | | | |
| R11 | 3831.77 | D11 | 5.29 | N6 | 1.80518 | ν6 | 25.4 |
| R12 | 49.81 | D12 | 10.73 | | | | |
| R13 | 168.11 | D13 | 6.77 | N7 | 1.66680 | ν7 | 33.0 |
| R14 | −140.86 | | | | | | |

Thick Lens Separations during Zooming with Object at Infinity

| Focal Length | D4 |
|---|---|
| 100.00 | 107.75 |
| 138.89 | 45.60 |
| 188.89 | 3.29 |

The 1st lens is a plastic lens with the 1st surface being aspherical, and the aspherical coefficients have the following values:

$$B = 6.0226 \times 10^{-8} \quad C = 1.4296 \times 10^{-11}$$
$$D = 1.2576 \times 10^{-16} \quad E = -7.1533 \times 10^{-20}$$
$$D' = -9.5006 \times 10^{-18}$$

EXAMPLE 7

| | | | | | | | |
|---|---|---|---|---|---|---|---|
| R1 | −16991.59 | D1 | 7.77 | N1 | 1.49171 | $\nu$1 | 57.4 |
| R2 | 57.51 | D2 | 23.97 | | | | |
| R3 | 82.06 | D3 | 11.11 | N2 | 1.69895 | $\nu$2 | 30.1 |
| R4 | 122.20 | D4 | Variable | | | | |
| R5 | 109.53 | D5 | 7.50 | N3 | 1.60311 | $\nu$3 | 60.7 |
| R6 | −1134.03 | D6 | 0.41 | | | | |
| R7 | 61.57 | D7 | 8.93 | N4 | 1.51633 | $\nu$4 | 64.1 |
| R8 | 164.84 | D8 | 5.95 | | | | |
| R9 | 70.00 | D9 | 6.45 | N5 | 1.51633 | $\nu$5 | 64.1 |
| R10 | 113.31 | D10 | 7.01 | | | | |
| R11 | 22608.78 | D11 | 8.57 | N6 | 1.80518 | $\nu$6 | 25.4 |
| R12 | 48.66 | D12 | 12.66 | | | | |
| R13 | 179.72 | D13 | 6.77 | N7 | 1.66680 | $\nu$7 | 33.0 |
| R14 | −140.80 | | | | | | |

Thick Lens Separations during Zooming with Object at Infinity

| Focal Length | D4 |
|---|---|
| 100.00 | 107.19 |
| 138.89 | 45.04 |
| 188.89 | 2.73 |

The 1st lens is a plastic lens with the 2nd surface being aspherical, and the aspherical coefficients have the following values:

$$B = -2.0417 \times 10^{-7} \quad C = -8.5999 \times 10^{-11}$$
$$D = 1.8530 \times 10^{-14} \quad E = -1.8008 \times 10^{-17}$$
$$D' = -9.3022 \times 10^{-19}$$

What is claimed is:

1. A zoom lens having a size smaller than prior art zoom lenses satisfying the following conditions:
    said zoom lens consisting of first and second lens groups disposed in respective order from its object side to its image side, said first lens group having a negative refractive power, said second lens group having a positive refractive power, the air separation between said first and second lens groups being varied to effect zooming,
    said first lens group consisting of a first lens having a negative refractive power and a second lens having a positive refractive power disposed in respective order from its object side to its image side,
    said first lens being made of a plastic material and having lens surfaces of which the lens surface at the image side has stronger refractive power than the lens surface at the object side, at least one of said lens surfaces being an aspherical surface being shaped such that as the height of incidence from the optical axis increases, the positive refractive power is increased,
    said second lens of positive refractive power being in the form of a meniscus lens having its convex surface directed toward its object side.

2. A zoom lens having a size smaller than prior art zoom lenses according to claim 1, in which the angle of view at wide angle end position in zooming is 62°±5%.

3. A zoom lens having a size smaller than prior art zoom lenses satisfying the following conditions:
    said zoom lens consisting of first and second lens groups disposed in respective order from its object side to its image side, said first lens group having a negative refractive power, said second lens group having a positive refractive power, the air separation between said first and second lens groups being varied to effect zooming,
    said first lens group consisting of a first lens having a negative refractive power, a second lens having a negative refractive power and a third lens having a positive refractive power disposed in respective order from its object side to its image side,
    said first lens of negative refractive power being in the form of a meniscus lens made of a plastic material having its convex surface directed toward its object side, said first lens having lens surfaces at least one of which is an aspherical surface being shaped such that as the height of incidence from the optical axis increases, the positive refractive power is increased,
    said second lens of negative refractive power being in the form of a meniscus lens having its convex surface directed toward its object side.

4. A zoom lens having a size smaller than prior art zoom lenses according to claim 3, in which the angle of view at wide angle end position in zooming is 84°±5%.

5. A zoom lens having a size smaller than prior art zoom lenses satisfying the following conditions:
    said zoom lens consisting of first and second lens groups disposed in respective order from its object side to its image side, said first lens group having a negative refractive power, said second lens group having a positive refractive power, the air separation between said first and second lens groups being varied to effect zooming,
    said first lens group consisting of a first lens having a negative refractive power, a second lens having a negative refractive power and a third lens having a positive refractive power disposed in respective order from its object side to its image side,
    said first lens of negative refractive power being in the form of a meniscus lens having its convex surface directed toward its object side,
    said second lens of negative refractive power being in the form of a meniscus lens made of a plastic material having its convex surface directed toward its object side and having lens surfaces at least one of which is an aspherical surface being shaped such that as the height of incidence from the optical axis increases, the positive refractive power is increased,
    said third lens of positive refractive power being in the form of a meniscus lens having its convex surface directed toward its object side.

6. A zoom lens having a size smaller than prior art zoom lenses according to claim 5, in which the angle of view at wide angle end position in zooming is 84°±5%.

* * * * *